(12) United States Patent
Talbot

(10) Patent No.: US 6,667,686 B2
(45) Date of Patent: Dec. 23, 2003

(54) CHILD SAFETY DEVICE FOR BUSES

(76) Inventor: Douglas C. Talbot, P.O. Box 1485, Vail, CO (US) 81658

( * ) Notice: Subject to any disclaimer, the term of this patent is extended or adjusted under 35 U.S.C. 154(b) by 0 days.

(21) Appl. No.: 10/094,106

(22) Filed: Mar. 13, 2002

(65) Prior Publication Data

US 2002/0186124 A1 Dec. 12, 2002

Related U.S. Application Data

(63) Continuation-in-part of application No. 09/877,393, filed on Jun. 8, 2001, now abandoned.

(51) Int. Cl.[7] ................................................. B60Q 1/26
(52) U.S. Cl. ........................................ 340/433; 340/457
(58) Field of Search ............................... 340/433, 426.1, 340/457, 425.5, 438, 309.7; 307/10.2, 10.3

(56) References Cited

U.S. PATENT DOCUMENTS

| | | |
|---|---|---|
| 5,128,651 A | 7/1992 | Heckart |
| 5,243,323 A | 9/1993 | Rogers |
| 5,874,891 A | 2/1999 | Lowe |
| 5,877,683 A | 3/1999 | Sheasley |
| 5,926,086 A | 7/1999 | Escareno et al. |
| 6,107,915 A | 8/2000 | Reavell et al. |
| 6,362,731 B1 * | 3/2002 | Lill ............................ 340/445 |

* cited by examiner

Primary Examiner—Nina Tong
(74) Attorney, Agent, or Firm—Nixon & Vanderhye P.C.

(57) ABSTRACT

A bus safety system for reminding a driver to search a bus for passengers comprising a receiver module incorporating a microprocessor, the receiver module programmed to control an alarm based on at least one selected time interval following activation; a wire harness attachable between the receiver module and an electrical system of the bus; and a transmitter incorporating an alarm deactivation switch and adapted to send RF signals; wherein the receiver module is adapted to receive the RF signals from the transmitter.

38 Claims, 2 Drawing Sheets

US 6,667,686 B2

CHILD SAFETY DEVICE FOR BUSES

This application is a continuation-in-part of application Ser. No. 09/877,393 filed Jun. 8, 2001 now abandoned.

This invention relates to a safety device for buses, and specifically, to a child safety device particularly applicable to school buses.

BACKGROUND OF THE INVENTION

There are several alarm systems currently available for ensuring that no children are left on a bus after the last scheduled stop. These systems require the driver to walk to the back of the bus to deactivate an alarm that will otherwise sound after a predetermined interval. In some cases, the driver can perform the check and deactivate the alarm while the ignition is on, for example, after the last stop but before returning to the bus yard. Examples of such alarm systems may be found in U.S. Pat. Nos. 6,107,915; 5,874,891; 5,243,323 and 5,128,651.

In each case, the alarm system is connected to the existing electrical system in the bus, and alarm components at the front and rear of the bus are hard wired. There remains a need for a safety alarm system that is simpler and less costly to install, and that provides bus drivers with greater flexibility with respect to the use and operation of the alarm system, but which does not permit the system to be circumvented.

BRIEF SUMMARY OF THE INVENTION

This invention provides a microprocessor-controlled wireless system for ensuring that the bus driver checks the bus for children after the last stop, and after the ignition has been turned off. In one embodiment, the system includes a self-contained battery operated transmitter located at the rear of the bus, and a self-contained receiver module located at the front of the bus. Utilization of radio frequency (RF) signals eliminates the need for hard wiring between the receiver module and the transmitter.

The receiver module at the front of the bus includes a microprocessor and a "plug-in" wire harness that is easily connected to the bus electrical system. In its simplest form, the receiver module need be connected only to the bus battery positive cable or terminal, the chassis ground, and the ignition "on" switch positive wire. Built-in circuitry is provided, however, for a first pre-alarm warning, a second pre-alarm warning and a full alarm. The full alarm may include a plurality of components such as the bus horn, parking lights, optional siren or any combination thereof. An optional plug-in LED provides visual indication of the alarm status. Momentary and service related override switches may also be included.

The battery operated transmitter located at the rear of the bus includes a deactivation button and a 9-volt battery compartment, but in an alternative arrangement, the transmitter may be powered by the bus battery.

In an exemplary configuration, when the driver effects a "triggering event," e.g., when he turns the ignition off, the receiver module is programmed to beep intermittently for a predetermined time period (the first pre-alarm warning). Thus, the driver has a relatively short but sufficient time to inspect the bus. During this initial time period, the transmitter is active but ignored by the receiver, so that it will not stop the further alarm sequence even if the deactivation button is pushed, i.e., the full initial time period must expire before the alarm deactivation button on the transmitter is effective.

After the first or initial time period, the intermittent beeping in the receiver module becomes a continuous beep (i.e., a second pre-alarm warning) to remind the driver that he/she has an additional period of time (preferably shorter than the first period) to finish checking the bus and to press the deactivation button on the transmitter to thereby preclude a full alarm from sounding. The full alarm will sound after these two time intervals (from ignition shut-off) if not deactivated.

The receiver module also includes two built-in relays that both begin to cycle after the second time period expires. One stops the horn sound after, for example, 3 minutes in the full alarm state, while the other continues the full alarm indefinitely, with the additional alarm elements, i.e., lights and/or siren. The system may be deactivated at any time by turning the ignition key to the ignition "on" position, or the ignition "accessory" position; by using the optional momentary override switch; or by pressing the transmitter deactivation button after the initial or first pre-alarm warning. Additional installation details are provided further herein.

The invention described herein is not limited to wireless RF arrangements. The programmable receiver module and the specific pre-alarm and full alarm sequence may be implemented with other wireless systems including, for example, infrared, acoustic, or with hard wired systems.

In addition, a motion sensor may be incorporated into the alarm system. This serves as an effective "double check" on the driver's search of the bus, particularly if the driver is careless in the search, or if the driver simply deactivates the switch without searching at all. The motion sensor would include a built-in time delay, so as to leave sufficient time for the driver to leave the bus. Another delay could also be incorporated so as to delay the alarm after motion is detected, thus allowing a driver time to deactivate the system upon re-entering the bus.

This additional feature also provides a measure of deterrence to vandalism, and may be supplemented by vibration and/or glass break detectors.

Accordingly, in one aspect, the invention relates to a bus safety alarm system for reminding a driver to search a bus for passengers comprising a receiver module incorporating a microprocessor, the receiver module programmed to control the alarm system; a wire harness attachable between the receiver module and an electrical system of the bus for providing electrical power to the alarm system, the electrical system including a bus ignition switch; and a transmitter incorporating an alarm deactivation switch and adapted to send RF signals to the receiver module to deactivate the alarm system; wherein the alarm system comprises a sequence that includes a first pre-alarm warning of a first duration for reminding the driver to search the bus, the first pre-alarm warning activated upon turning the bus ignition switch off; a second different pre-alarm warning of a second duration for reminding the driver to complete the search before expiration of the second pre-alarm warning; and a full alarm; the receiver module programmed to ignore the RF signals from the transmitter during the first pre-alarm warning.

In another aspect, the invention relates to a bus bus safety alarm system for reminding a driver to search the bus for passengers comprising a receiver module incorporating a microprocessor programmed to control an alarm sequence including at least one pre-alarm and a full alarm, and a wire harness electrically connected between the receiver module and an electrical system of the bus, the electrical system including an ignition switch, the receiver module programmed to activate the alarm sequence when the ignition switch is turned off; a transmitter incorporating an alarm deactivation switch and adapted to transmit RF signals to the receiver module to deactivate the alarm system, but wherein the receiver module is programmed to ignore the RF signals from the transmitter during the at least one pre-alarm; and at least one override switch electrically connected to an ignition switch accessory position of the ignition switch for deactivating the alarm system.

In still another aspect, the invention relates to a bus safety alarm system for reminding a driver to search a bus for passengers comprising an alarm sequence including at least one pre-alarm warning and a full alarm; a receiver module incorporating means for controlling the alarm sequence following activation of the alarm system; a wire harness attachable between the receiver module and an electrical system of the bus, the electrical system including a bus ignition switch; and a transmitter incorporating an alarm deactivation switch, the transmitter adapted to communicate with the receiver module when the alarm deactivation switch is actuated; wherein the pre-alarm warning provides sufficient time for the driver to search the bus and wherein the receiver module is programmed to ignore signals from the transmitter during the pre-alarm warning.

In still another aspect, the invention relates to a bus safety system for reminding a driver to search a bus for passengers comprising an alarm sequence including at least a first pre-alarm warning for reminding the driver to search the bus, and a full alarm; a receiver module incorporating a microprocessor, the receiver module programmed to control the alarm sequence following activation of the alarm sequence; means for establishing electrical connection between the receiver module and an electrical system of the bus including an ignition switch, for activating the alarm sequence when the ignition switch is turned off; a transmitter located remote from the receiver module, incorporating an alarm deactivation switch and adapted to communicate with the receiver module; and a motion sensor operatively connected to the receiver module and adapted for activation after the alarm sequence has been deactivated, and upon detection of motion in the bus.

In still another aspect, the invention relates to a bus comprising a chassis; an electrical system including a horn and parking lights and an ignition switch; and a safety system for reminding a driver to search the bus for passengers, the safety system comprising a receiver module incorporating a microprocessor, the receiver module programmed to activate an alarm sequence after, the alarm sequence including at least a first pre-alarm warning and a full alarm; means for electrically connecting the receiver module and the electrical system of the bus such that the alarm sequence is activated upon a triggering event in the electrical system; and a transmitter incorporating an alarm deactivation switch and adapted to send signals to the receiver module to deactivate the alarm when the alarm deactivation switch is actuated; and a motion sensor controlled by the receiver module, the motion sensor actuated only after the alarm system is deactivated by the deactivation switch.

Objects and advantages not expressly mentioned above will become apparent from the detailed description that follows.

DETAILED DESCRIPTION OF THE INVENTION

Figure 1:
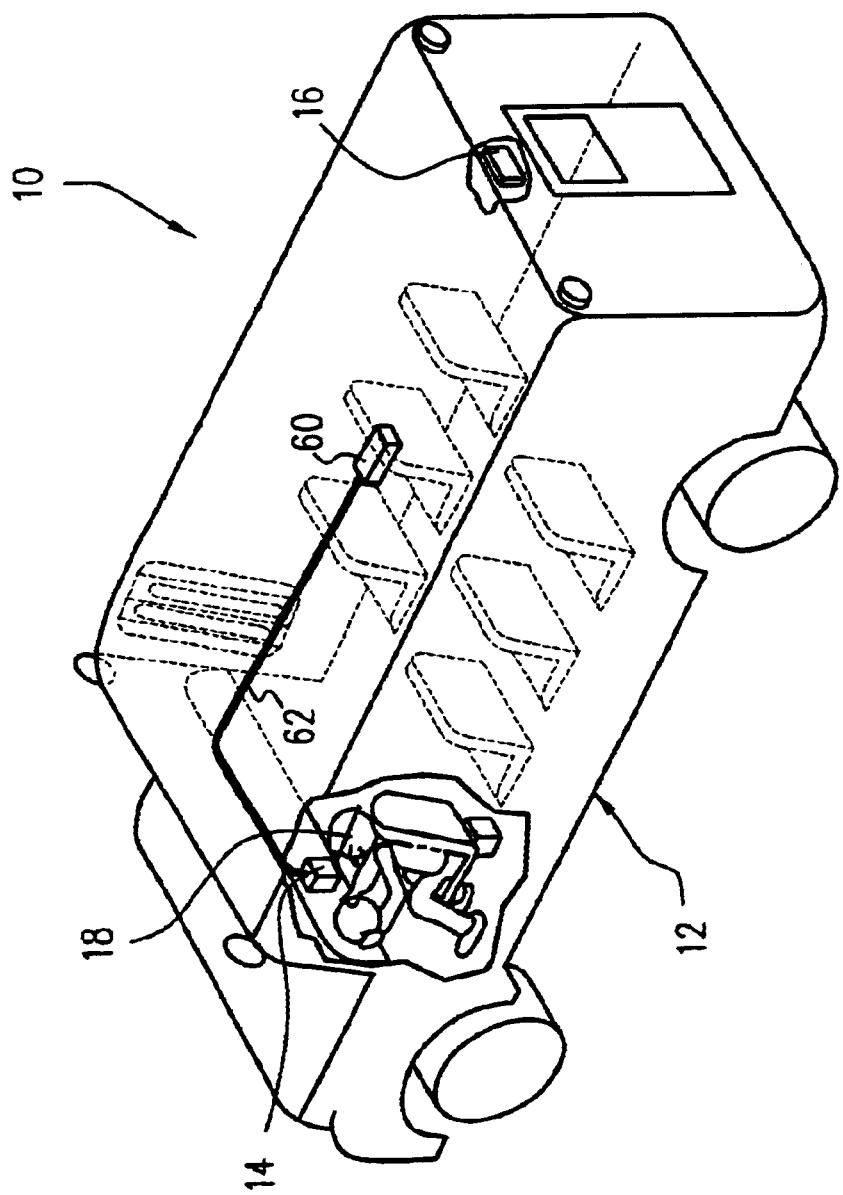
FIG. 1 is a simplified perspective of a bus chassis, indicating the location of the wireless RF components of the invention.
Figure 2:
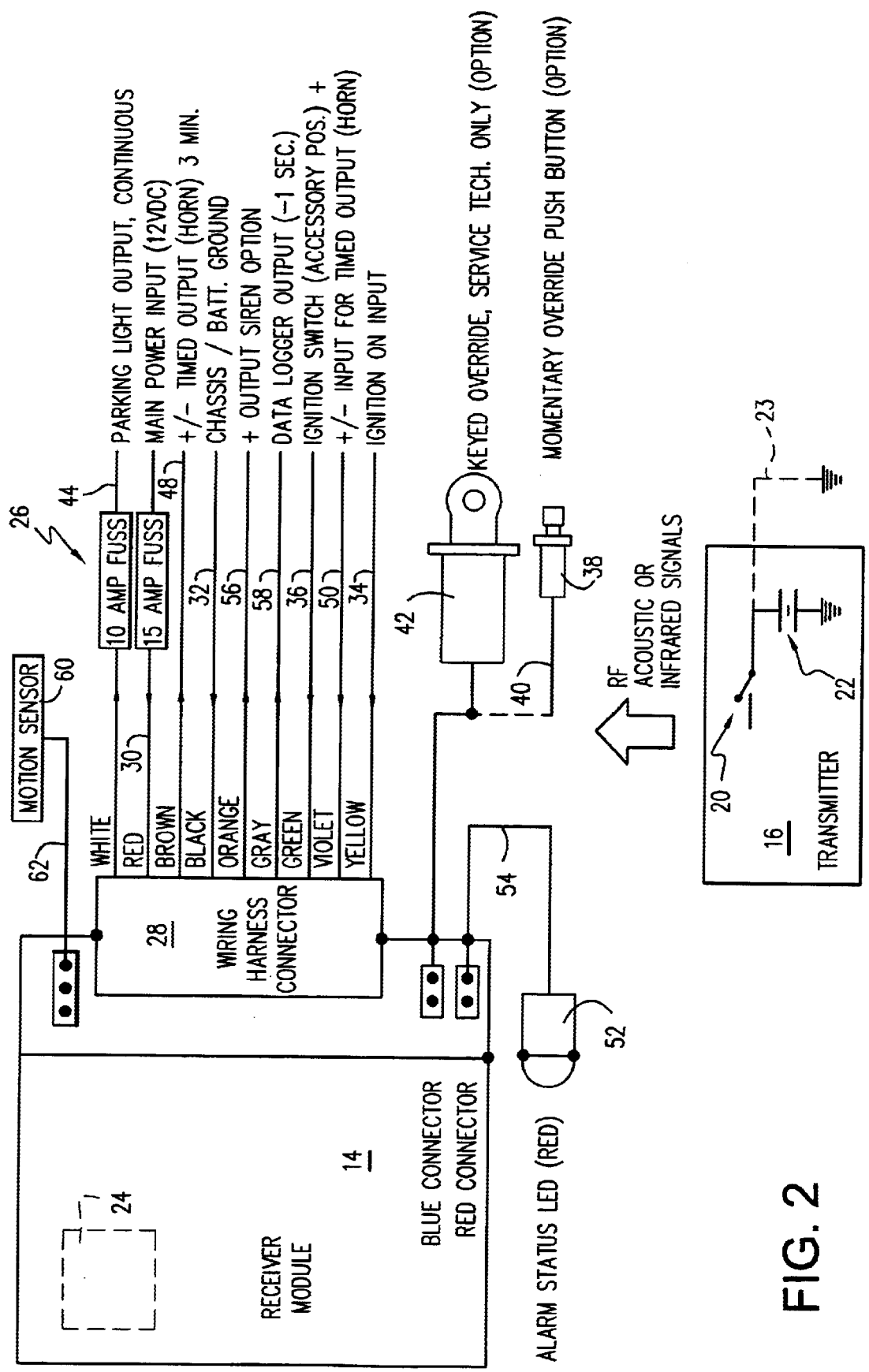
FIG. 2 is a simplified wiring diagram, illustrating the receiver module wiring harness connections to the bus electrical system.

With reference to FIGS. 1 and 2, a typical bus 10 includes a chassis generally indicated at 12. A receiver module 14 in accordance with the invention is shown at the forward end of the chassis, in proximity to the bus driver 18, e.g., on the dashboard. A transmitter 16 is located at the rear of the bus, preferably in an out-of-the-way position, relatively inaccessible to passengers in the bus. The receiver module 14 is intended to work with the existing wiring of the bus, and to receive wireless radio frequency (RF), acoustic or infrared signals from the transmitter 16. Thus, no hard wiring is required between the receiver/controller and the transmitter. This arrangement is particularly recited for retrofit applications, but hard wiring may be utilized particularly if installed during production of the bus.

The transmitter 16 is a self-contained battery operated transmitter with a single one-button transmitter switch 20 (representing the deactivation button). The transmitter is powered by a single nine volt battery 22 with an approximate three year life, but the battery is located in an easily accessible compartment for replacement. Alternatively, the transmitter may be wired so as to be powered by the bus battery 23 as shown in phantom in FIG. 2.

As indicated above, the transmitter 16 is preferably mounted inside the bus at the rear end thereof, in an up and out of the way location so as not to invite access by bus passengers. The transmitter may be attached by one or more screws (or other suitable fasteners) to a desired mounting location, and preferably incorporates a cover that permits access to the battery compartment.

The receiver module 14 is located at the driver end of the bus, preferably on or under the dashboard, keeping in mind the need to make a connection to the ignition switch, power supply and relay control panel already existing in the bus.

The receiver module 14 is also preferably mounted using one or more screws or other suitable fasteners. It is important that the antenna wire (not shown) of the receiver module 14 not be covered by any metal bus chassis parts so as not to impede its range.

The receiver module 14 incorporates a microprocessor 24 (or equivalent circuitry) programmed to sequence the alarm conditions as further described herein. A main wiring harness 26, with a plug-in connector 28 adapted for connection with the receiver module, enables a series of electrical inputs to, and outputs from, the receiver module 14, and is used to connect the receiver module to the bus electrical system without modification of the latter. On the input side, wire 30 is connected to the twelve volt bus battery and wire 32 is connected to a chassis ground. Wire 34 is connected to the main ignition switch wire, while wire 36 is connected to the ignition switch "accessory" position wire. An optional momentary override switch 38 may be mounted at a location (remote or proximate to the receiver module), for programming and emergency override situations. The override switch 38 is connected to the receiver module via wire 40. A keyed override switch 42 may be in a hidden location, available for service technicians only.

On the output side, wire 44 is connected to the buses' flashing parking lights 46 (see FIG. 1), and wire 48 is connected to the horn. Relays in the receiver module 14 are programmed to limit the horn sounds in full alarm to 3 minutes as described further below. An input wire 50 for the timed output is also connected to the horn. An alarm status indicator (an LED device) 52 is connected to the receiver module via wire 54 and an optional siren is connected via wire 56. An optional data logger for monitoring system activity may be connected to the receiver module via harness wire 58. It will be appreciated that the described harness 26 is exemplary only, and other harness configurations may be provided, depending on the particular application.

It is also a feature of the invention to include a motion sensor 60 that may be wire connected to the wiring harness 28 or directly to the receiver module 14 via wire 62. The motion sensor may be of the microwave type but other conventional motion sensors may be employed. The motion sensor may be located as desired within the bus, preferably optimally arranged to detect any motion inside the bus. Activation of the sensor and/or commencement of the alarm sequence after motion detection, may be delayed for a short period of time as further described below. The programming of the microprocessor 24 and/or related circuitry to implement the delays are well within the skill of the art.

Operation of the wireless safety system in an exemplary configuration is as follows. Once the bus driver ends his/her run, and the ignition switch is turned "off," a microprocessor-controlled beeping sound of 90 second duration prompts the driver to check for children remaining in the bus. Thus, the driver will have 90 seconds to check around and under each seat, as he progresses to the rear of the bus. During this initial 90 seconds of pre-alarm warning, the deactivation button on the transmitter 16 (for closing the switch 20) mounted at the back of the bus remains active but the receiver is programmed to ignore the transmitter during the 90 second pre-alarm warning. Therefore, the pre-alarm warning must expire before the transmitter 16 is recognized. After 90 seconds, the intermittent beeping is programmed to become continuous, so as to remind the driver that he or she has an additional 30 seconds to finish checking the bus and to press the deactivation button on the transmitter 16 to close the switch 20 and prevent the full alarm from sounding. This additional 30 seconds is also referred to as the pre-alarm stage. The specific time durations mentioned herein are exemplary only, and the receiver module may be programmed for different time periods as desired.

The full alarm will sound after two minutes (the 90 second pre-alarm warning and 30 second pre-alarm) if the transmitter button is not pushed. The full alarm may consist of flashing of the parking lights 46, intermittent sounding of the horn 50, and/or the optional siren 58 in any combination. Horn sounds in the full alarm state are controlled by a relay (not shown) in the receiver and limited to three minutes if not deactivated. However, a second relay (not shown) may continue the full alarm with flashing parking lights (with or without siren). The duration of the various sounds and/or lights in the full alarm state can be programmed as desired, and are oftentimes dictated by local ordinances.

The alarm system may be deactivated at any time by turning the ignition switch 36 to the "on" or "accessory" position, by activating the override switch 36, or by pushing the transmitter button after the 90 second pre-alarm has expired.

The inclusion of parking lights 46 in the alarm is especially helpful, particularly in instances where there are numerous school buses parked in a lot, and in the full alarm state, the school bus can be easily detected via the flashing lights, enabling the alarm to be turned off more quickly. In addition, using the optional override switch 38 prevents the alarm system from sounding on a momentary or temporary basis, while the keyed override switch 42 is available for service requirements by technicians. Upon completion of any maintenance, the system must be activated and a 90 second wait completed before activating the system in a normal manner.

The mounting override switch 38 is designed to connect to the ignition switch "accessory" position, dome light or door switch. Thus, the override switch will disarm all alarm conditions while picking up children, or in stop and go situations when the engine must be turned off. For example, local requirements may dictate maximum engine idle time, after which the engine must be turned off.

In the event the driver deactivates the alarm system by engaging the transmitter switch 20 at the back of the bus, the motion sensor 56 now comes into play. Activation of the sensor per se is preferably delayed for a short period of time, e.g., 1–2 minutes, so that the driver has time to exit the bus without detection by the sensor. Upon expiration of the delay, the sensor is activated and senses any motion inside the bus. The sensor may be configured to activate any alarm or sequence of alarms, e.g., horn, flashing lights or alarm sounds individually or in any combination. Thus, in the event a driver did not perform a careful search during the allotted time, the motion sensor would trigger the chosen alarm elements that would, in turn, cause a research of the bus for a child not previously discovered by the driver.

It will be appreciated by those skilled in the art that the motion sensor will also detect intruders entering the bus, activate the alarm, and either scare off the intruders, or at least alert others to their presence.

A suitable delay in the alarm could also be incorporated into the motion sensor configuration, allowing the bus driver to re-enter and deactivate the alarm sequence. In other words, the sensor would detect motion but the alarm elements would only be activated after a short time delay. This is useful if the driver must exit the bus for a short period of time, but intends to re-enter the bus, or to give a driver entering the bus at the beginning of a scheduled run sufficient time to deactivate and re-set the system.

The receiver module 14 utilizes ultra low idle current when the ignition is "off" and the alarm deactivated. Thus, there is no significant drain on the vehicle battery 24 when the system is inactive. In addition, the receiver module 14 and transmitter 16 are individually coded to prevent bus-to-bus interference and the receiver can learn new transmitter codes. This allows either of the transmitter or receiver module to be replaced individually in the case of failure.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A bus safety system for reminding a driver to search a bus for passengers comprising:

an alarm sequence including at least a first pre-alarm warning for reminding the driver to search the bus, and a full alarm;

a receiver module incorporating a microprocessor, said receiver module programmed to control said alarm sequence following activation of said alarm sequence;

means for establishing electrical connection between the receiver module and an electrical system of the bus including an ignition switch, for activating said alarm sequence when the ignition switch is turned off;

a transmitter located remote from the receiver module, incorporating an alarm deactivation switch and adapted to communicate with the receiver module; and a motion sensor operatively connected to the receiver module and adapted for activation after said alarm sequence has been deactivated, and upon detection of motion in the bus.

2. The system of claim 1 wherein said first pre-alarm warning comprises a sound of a first duration and wherein said alarm sequence further comprises a second different pre-alarm warning sound of a second duration shorter than said first duration, and wherein said full alarm comprises a plurality of full alarm components.

3. The system of claim 2 and further comprising means for initiating said full alarm in the event the alarm deactivation switch is not pressed after said first pre-alarm warning sound terminates before said second pre-alarm sound terminates.

4. The system of claim 3 wherein said electrical system includes a bus horn and bus parking lights and wherein said means for establishing electrical connection between said receiver module and said electrical system includes a wire harness, and wherein said full alarm components include at least sounds from said bus horn and flashing of said bus parking lights.

5. The system of claim 4 including a siren connected via the wire harness to the receiver module, for sounding in said full alarm.

6. The system of claim 4 wherein an alarm status indicator is electrically connected to said wiring harness.

7. The system of claim 4 wherein a data logger for monitoring system activity is electrically connected to said wiring harness.

8. The system of claim 3 and further comprising an optional override switch for deactivating the system.

9. The system of claim 2 wherein said first duration is 90 seconds and said second duration is 30 seconds.

10. The system of claim 9 wherein said full alarm is activated for a third time interval of about 3 minutes for a selected one of said full alarm components, and indefinitely for at least another of said full alarm components unless otherwise deactivated.

11. The system of claim 10 wherein said means is configured to ignore any signal from said transmitter switch during said first pre-alarm warning, and to deactivate the system when a signal is received from said transmitter during or after said second pre-alarm warning.

12. The system of claim 1 wherein said transmitter is powered by a battery located in the transmitter.

13. The system of claim 1 wherein said transmitter is adapted to be powered by a bus battery.

14. The system of claim 1 wherein said transmitter communicates with said receiver by radio frequency, acoustic or infrared signals.

15. The system of claim 1 wherein said motion sensor is configured to be activated a predetermined time after said alarm deactivation switch is actuated.

16. The system of claim 15 wherein said motion sensor activates a motion alarm a predetermined time after motion detection occurs.

17. A bus comprising a chassis; an electrical system including a horn and parking lights and an ignition switch; and a safety system for reminding a driver to search the bus for passengers, the safety system comprising:

a receiver module incorporating a microprocessor, said receiver module programmed to activate an alarm sequence, said alarm sequence including at least a first pre-alarm warning and a full alarm;

means for electrically connecting the receiver module and the electrical system of the bus such that the alarm sequence is activated upon a triggering event in said electrical system; and a transmitter incorporating an alarm deactivation switch and adapted to send signals to said receiver module to deactivate said alarm when said alarm deactivation switch is actuated; and a motion sensor controlled by said receiver module, said motion sensor actuated only after said alarm system is deactivated by said deactivation switch.

18. A bus safety alarm system for reminding a driver to search a bus for passengers comprising:

a receiver module incorporating a microprocessor, said receiver module programmed to control the alarm system;

a wire harness attachable between the receiver module and an electrical system of the bus for providing electrical power to the alarm system, said electrical system including a bus ignition switch; and a transmitter incorporating an alarm deactivation switch and adapted to send RF signals to said receiver module to deactivate the alarm system;

wherein said alarm system comprises a sequence that includes a first pre-alarm warning of a first duration for reminding the driver to search the bus, said first pre-alarm warning activated upon turning the bus ignition switch off; a second different pre-alarm warning of a second duration for reminding the driver to complete the search before expiration of said second pre-alarm warning; and a full alarm; said receiver module programmed to ignore said RF signals from said transmitter during said first pre-alarm warning.

19. The system of claim 18 and further comprising means for initiating said full alarm in the event the alarm deactivation switch is not pressed after expiration of said pre-alarm warning and before expiration of said second pre-alarm warning.

20. The system of claim 19 wherein said electrical system further comprises a bus horn and bus parking lights, and wherein said full alarm includes at least sounding of said bus horn and flashing of said bus parking lights.

21. The system of claim 20 including a siren connected via the wire harness to the receiver module, for sounding in said full alarm.

22. The system of claim 19 and further comprising an optional override switch for deactivating said alarm system.

23. The system of claim 18 wherein said transmitter is battery operated.

24. The system of claim 18 wherein an alarm status indicator is electrically connected to said wiring harness.

25. The system of claim 18 wherein a data logger for monitoring system activity is electrically connected to said wiring harness.

26. A bus safety alarm system for reminding a driver to search the bus for passengers comprising:

a receiver module incorporating a microprocessor programmed to control an alarm sequence including at least one pre-alarm and a full alarm, and a wire harness electrically connected between the receiver module and an electrical system of the bus, said electrical system including an ignition switch, said receiver module programmed to activate the alarm sequence when the ignition switch is turned off;

a transmitter incorporating an alarm deactivation switch and adapted to transmit RF signals to said receiver module to deactivate said alarm system, but wherein said receiver module is programmed to ignore said RF signals from said transmitter during said at least one pre-alarm; and at least one override switch electrically connected to an ignition switch accessory position of said ignition switch for deactivating the alarm system.

27. The system of claim 26 wherein said electrical system includes a bus horn and bus parking lights, and wherein said full alarm includes sounding of said bus horn and flashing of said bus parking lights.

28. The system of claim 27 wherein said wire harness is also adapted for connection to a bus siren for sounding in said full alarm.

29. The system of claim 27 wherein said at least one pre-alarm includes a first pre-alarm warning sound of a first duration, and wherein said alarm sequence includes a second pre-alarm warning sound of a second duration shorter than said first duration.

30. The system of claim 29 wherein said first duration is 90 seconds and said second duration is 30 seconds.

31. A bus safety alarm system for reminding a driver to search a bus for passengers comprising:

an alarm sequence including at least one pre-alarm warning and a full alarm;

a receiver module incorporating means for controlling the alarm sequence following activation of the alarm system;

a wire harness attachable between the receiver module and an electrical system of the bus, said electrical system including a bus ignition switch; and a transmitter incorporating an alarm deactivation switch, said transmitter adapted to communicate with said receiver module when said alarm deactivation switch is actuated;

wherein said pre-alarm warning provides sufficient time for the driver to search the bus and wherein said receiver module is programmed to ignore signals from said transmitter during said pre-alarm warning.

32. The system of claim 31 wherein said pre-alarm warning extends over a first selected time interval of about 90 seconds and includes a pre-alarm warning sound.

33. The system of claim 32 wherein said alarm sequence includes a second different pre-alarm warning sound for a second selected time interval shorter than said first selected time interval, and wherein said full alarm is activated only if said deactivation switch is not actuated during said second time interval.

34. The system of claim 33 wherein said selected second time interval is about 30 seconds.

35. The system of claim 33 wherein said electrical system includes a bus horn and bus parking lights, and wherein said full alarm includes a plurality of full alarm components comprising sounding of said bus horn and flashing of said parking lights.

36. The system of claim 35 wherein said full alarm is activated for a third time interval of about 3 minutes for a selected one of said plurality of full alarm components, and indefinitely for at least another of said plurality of full alarm components unless otherwise deactivated.

37. The system of claim 36 wherein said full alarm components include a siren connected via the wire harness to the receiver module.

38. The system of claim 31 and further comprising at least one override switch for deactivating the system.

* * * * *